UNITED STATES PATENT OFFICE.

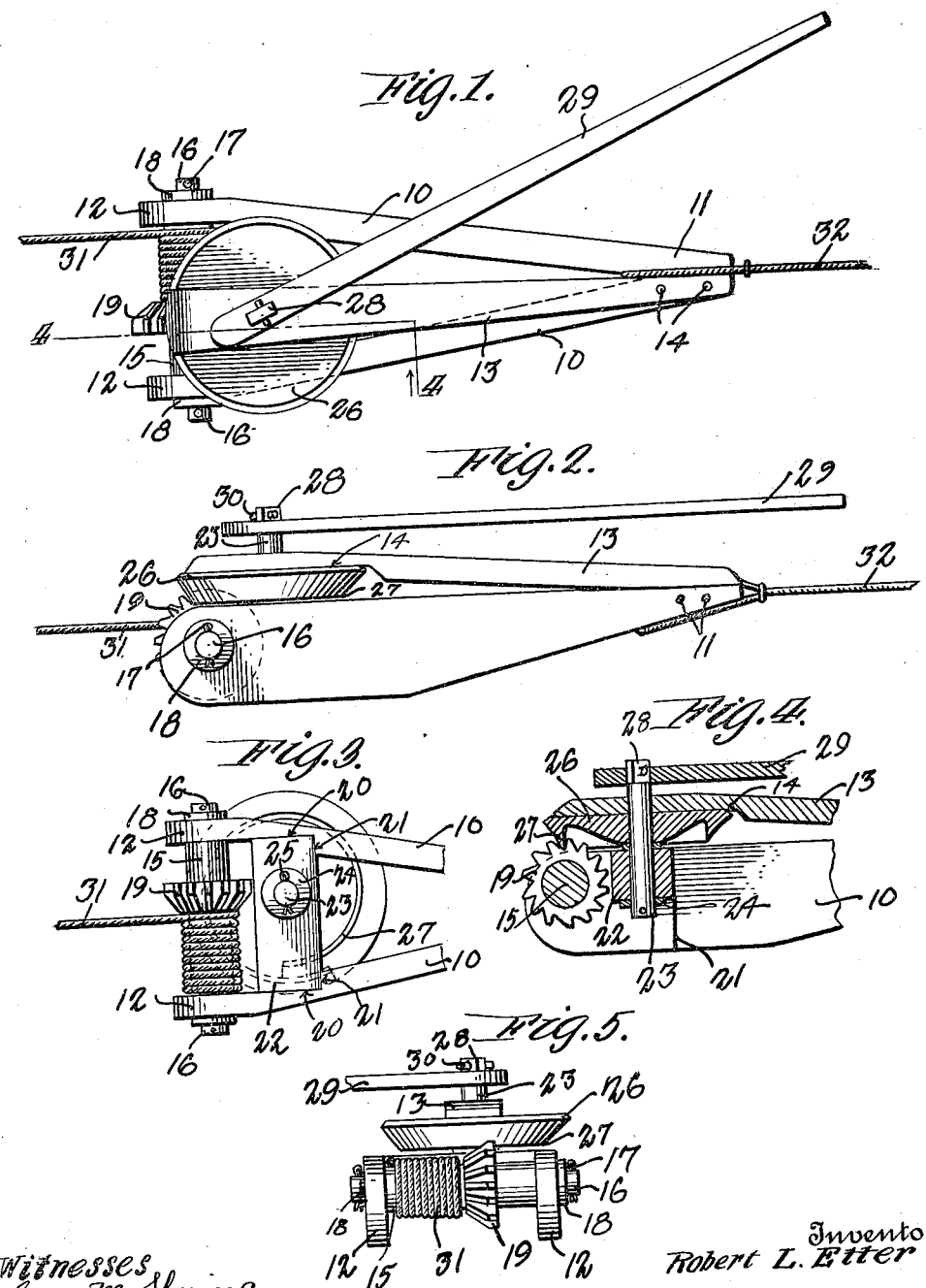

ROBERT L. ETTER, OF PAWNEE CITY, NEBRASKA.

STUMP-PULLER.

1,297,817.  Specification of Letters Patent.  Patented Mar. 18, 1919.

Application filed October 11, 1918. Serial No. 257,741.

*To all whom it may concern:*

Be it known that I, ROBERT L. ETTER, a citizen of the United States, residing at Pawnee City, in the county of Pawnee and State of Nebraska, have invented certain new and useful Improvements in Stump-Pullers, of which the following is a specification.

This invention is a stump puller and has for its principal object the production of efficient winding mechanism thereon, whereby when the frame is anchored in a set position and the cable connected to the drum is also secured to a stump, the operation of the winding mechanism will draw the stump toward the frame and thus pull the same from the ground.

Another object of this invention is the production of a stump puller wherein a disk is employed and is provided with a spiral rib thereon for engaging a pinion connected to the winding drum whereby as the disk is rotated the rib will cause the pinion to rotate the drum although it locks the drum against accidental counter rotation when movement of the disk ceases.

Another object of this invention is the production of a stump puller wherein the frame is constructed to efficiently support the several operating elements, thus holding the device in condition for operation at all times.

One practical form of construction and assembly of the present invention will be hereinafter described and is illustrated in the drawing in which Figure 1 is a top plan view of the stump puller.

Fig. 2 is a side elevation of the stump puller.

Fig. 3 is a bottom plan view of the forward portions of the device.

Fig. 4 is a section taken on the line 4—4 of Fig. 1, and

Fig. 5 is a front elevation of the stump puller.

The frame consists of a pair of side bars 10 which converge toward their rear ends and are connected as indicated at 11. The forward ends 12 of the side bars 10 are parallel for purposes to be hereinafter set forth. The journal bar 13 is fixed on the upper surface of one of the side bars 10 as indicated at 14, although the forward end of the journal bar 13 is spaced above the forward portion of the side bars 10. This journal bar 13 has a flat surface 14 formed therein by being notched, as indicated in Fig. 2 for reasons to be hereinafter set forth.

A drum 15 is interposed between the parallel ends 12 of the side bars 10, it being noted that the flat ends of the drum 15 engage the inner surfaces of the ends 12 and since these ends are parallel, undue frictional binding action is prevented. Stub shafts 16 extend from the ends of the drum 15 and pass through the side bars 10, as illustrated in several figures of the drawing. Cotter pins 17 are passed through the projecting ends of the stub axles 16 and thus tend to hold the forward ends of the side bars from spreading. Bearing washers 18 are carried upon the stub axles 16 and bear upon the outer surfaces of the parallel portions 12 of the side bars 10 and thus reduce friction between the cotter pins and the side bars. It is of course obvious that any other desired retaining elements may be employed instead of the cotter pins although it will be noted that the drum is free to rotate. A beveled pinion 19 is fixed upon the drum 15 intermediate the ends thereof, for purposes to be hereinafter set forth.

The side bars 10 are provided with inner parallel walls 20 which extend to the flat abutment shoulders 21 formed by notching the inner surfaces of these side bars. The bearing block 22 fits between the side bars and bears upon the shoulders 21, which hold the block against movement in one direction.

The vertical shaft 23 extends through the bearing block 22 and the lower end of this shaft carries a washer 24 and a retaining pin 25. The disk 26 is keyed upon the shaft 23 in any desired manner and fits within the notched portion 14 of the journal bar 13. It will also be noted that the shaft 23 extends through the journal bar 13 adjacent the forward end thereof. The disk 26 has a spiral rib 27 formed upon its lower surface, as shown in Figs. 3 and 4 and this rib 27 meshes with the beveled pinion 19 of the drum 15, as shown clearly in Figs. 3, 4 and 5.

The outer end of the shaft 23 is rectangular as shown at 28 and the operating handle 29 is slipped over the end 28 and retained in position by the pin 30.

When the present invention is in use the cable 31 connected to the drum 15 may be secured to the stump to be pulled, while the cable 32 connected to the opposite end of the frame may be secured to any suitable anchor means. The handle 29 may then be swung in a circle, it being obvious that the handle may be operated by a person, draft animal or tractor means or any other way desired without departing from the spirit of the present invention. As this handle is swung in a circle it will rotate the shaft 23 and thus cause the disk 26 to be rotated. As this disk 26 rotates the spiral rib 29 will be engaging the beveled pinion 19 and thus rotate the beveled pinion by turning the same in one direction and for this reason the drum will be rotated. As the drum rotates the cable 31 will be wound thereon thus pulling the stump from the ground. The engagement between the spiral rib and the beveled pinion constitutes a lock for permitting the accidental counter rotation of the drum. As soon as the stump has been pulled it is obvious that the handle may be rotated in the opposite direction and thus cause the cable 31 to be unreeled from the drum 15.

Although the present invention is described as a stump puller, it is obvious it may be employed as a wire stretcher, since one strand of wire may be connected to the frame and another strand to the drum, and also that the driving mechanism may be employed for a number of different uses, such for instance as upon derricks where it is necessary to rotate the drum by a simple means which will also constitute a lock for preventing accidental counter rotation of the disk.

Furthermore, it will be noted that the manner in which the several bars are arranged and carry the stub axles and shafts as well as the bearing block cause the disk and the beveled pinion to be in operative engagement with each other at all times, while the strain imparted to the frame when the device is in use will be evenly distributed thereover, thus preventing the device from being accidentally injured under the usage.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. In a device of the class described, the combination of a pair of side bars converging and connected together at their rear ends and adjacently spaced apart and terminating in parallel forward portions, a drum interposed between the pair of forward portions having stub axles passing through said portions, a pinion carried by the drum, a journal bar fixed to the rear end of one of said side bars and extending upwardly from the said side bar, said journal bar having a flat notched inner surface, a shaft rotatably mounted in the forward end of the journal bar, a flat disk keyed upon said shaft and fitting upon the flat notched portion of the journal bar and projecting above the upper portions of said side bars, a spiral rim formed upon said disk and engaging said pinion, and means for rotating said shaft.

2. In a device of the class described, the combination of a pair of side bars converging and connected together at their rear ends and adjacently spaced apart and terminating in parallel forward portions, a drum interposed between the pair of forward portions having stub axles passing through said portions, a pinion carried by the drum, said side bars having parallel walls communicating with abutment shoulders, a bearing block interposed between the side bars and bearing upon said shoulders, a journal bar fixed to the rear end of one of said side bars and extending upwardly from the said side bars, said journal bar having a flat notched inner surface, a shaft passing through said bearing block and said journal bar, a flat disk keyed upon said shaft and fitting upon the flat notched portion of the journal bar and projecting above the upper portions of said side bars, a spiral rib formed upon said disk and engaging said pinion, and means for rotating said shaft, whereby said disk will be rotated for causing the rib thereof to rotate said pinion and said drum.

In testimony whereof I affix my signature in presence of two witnesses.

ROBERT L. ETTER.

Witnesses:
JAMES L. STEWART,
DAVID W. OSBORN.

Copies of this patent may be obtained for five cents each, by addressing the "Commissioner of Patents, Washington, D. C."